United States Patent
Stessen et al.

(10) Patent No.: US 10,419,767 B2
(45) Date of Patent: Sep. 17, 2019

(54) ENCODING VIDEO WITH THE LUMINANCES OF THE PIXEL COLORS CONVERTED INTO LUMAS WITH A PREDETERMINED CODE ALLOCATION AND DECODING THE VIDEO

(71) Applicant: KONINKLIJKE PHILIPS N.V., Eindhoven (NL)

(72) Inventors: Jeroen Hubert Christoffel Stessen, Eindhoven (NL); Renatus Josephus Van Der Vleuten, Veldhoven (NL); Johannes Gerardus Rijk Van Mourik, Eindhoven (NL); Rutger Nijland, Someren-Eind (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 115 days.

(21) Appl. No.: 15/119,735

(22) PCT Filed: Feb. 12, 2015

(86) PCT No.: PCT/EP2015/052931
§ 371 (c)(1),
(2) Date: Aug. 18, 2016

(87) PCT Pub. No.: WO2015/124486
PCT Pub. Date: Aug. 27, 2015

(65) Prior Publication Data
US 2017/0054989 A1    Feb. 23, 2017

Related U.S. Application Data

(60) Provisional application No. 62/022,298, filed on Jul. 9, 2014.

(30) Foreign Application Priority Data

Feb. 21, 2014    (EP) .................... 14156184

(51) Int. Cl.
H04N 9/77      (2006.01)
H04N 19/186    (2014.01)
(Continued)

(52) U.S. Cl.
CPC .......... H04N 19/186 (2014.11); H04N 1/646 (2013.01); H04N 9/67 (2013.01); H04N 9/77 (2013.01); H04N 19/44 (2014.11)

(58) Field of Classification Search
None
See application file for complete search history.

(56) References Cited

U.S. PATENT DOCUMENTS

2010/0008427 A1 * 1/2010 Chiu ................. H04N 1/64
375/240.18
2014/0044372 A1   2/2014 Mertens
(Continued)

FOREIGN PATENT DOCUMENTS

WO    2010104624 A2    9/2010
WO    2012147022 A2    11/2012
WO    2015124754 A1    8/2015

OTHER PUBLICATIONS

Kikuchi et al, "Compression of High Dynamic Range Images in the YU'V' Color Space", ITC-CSCC, 2013, pp. 631-634.
(Continued)

Primary Examiner — Michael J Hess

(57) ABSTRACT

Because we needed a new improved and very different color encoding space for being able to faithfully encode the presently emerging high dynamic range video for good quality rendering on emerging HDR displays such as the SIM2 display, the video encoder (300) with an input (308) to obtain a video from a video source (301) wherein pixel colors are encoded in an (XYZ) color encoding, the video encoder comprising an opto-electronic conversion unit (304) arranged to convert the luminances (Y) of the pixel colors
(Continued)

into lumas (Y') with a predetermined code allocation function (F), characterized in that the video encoder comprises a chromaticity determination unit (310), which is arranged to encode chromaticities (u",v") of pixel colors with lumas (Y') below a predetermined threshold luma (E') with a mathematical chromaticity definition which yields a maximum encodable saturation (S_bL) for a particular hue for pixel colors with a luma below the predetermined threshold luma (E') which is lower than a maximum encodable saturation (S_bH) for the particular hue for a pixel color with a luma above the predetermined threshold luma (E'), and a constant maximum encodable saturation (S_bH) for pixels with colors of a particular hue and a luma equal to or larger than the predetermined threshold luma (E').

14 Claims, 5 Drawing Sheets

(51) Int. Cl.
*H04N 1/64* (2006.01)
*H04N 9/67* (2006.01)
*H04N 19/44* (2014.01)

(56) References Cited

U.S. PATENT DOCUMENTS

| | | | | |
|---|---|---|---|---|
| 2014/0368530 A1* | 12/2014 | James | ............... | G06Q 30/0643 |
| | | | | 345/593 |
| 2015/0248747 A1* | 9/2015 | Atkins | ..................... | G06T 5/10 |
| | | | | 345/589 |
| 2016/0005349 A1* | 1/2016 | Atkins | ..................... | H04N 5/20 |
| | | | | 345/591 |

OTHER PUBLICATIONS

Larson, "The Logluv Encoding for Full Gamut, High Dynamic Range Images", Journal of Graphics Tools, vol. 3, No. 1, 1999, pp. 15-31.
"Chromaticity", Downloaded From http://en.wikipedia.org/wiki/chromaticity_diagram, Nov. 26, 2015, pp. 1-3.
"Cieluv", Downloaded From http://en.wikipedia.org/wiki/cieluv, May 16, 2015, pp. 1-2.
"YDzDx Color-Difference Encoding for XYZ Signals", WD SMPTE Standard S085-20XX, Version 1.05, 2013, pp. 1-7.
Mantiuk, et al, "Lossy Compressiosn of High Dynamic Range Images and Video", Proc. SPIE, 2006, pp. 1-10.
Okuda et al, "Effective Color Space Representation for Wavelet Based Compression of HDR Images", 14th International Conference on Image Analysis and Processing (ICIAP), 2007, pp. 388-392.

* cited by examiner

ENCODING VIDEO WITH THE LUMINANCES OF THE PIXEL COLORS CONVERTED INTO LUMAS WITH A PREDETERMINED CODE ALLOCATION AND DECODING THE VIDEO

CROSS-REFERENCE TO PRIOR APPLICATIONS

This application is the U.S. National Phase application under 35 U.S.C. § 371 of International Application No. PCT/EP2015/052931, filed on Feb. 12, 2015, which claims the benefit of European Patent Application No. EP14156184.5, filed on Feb. 21, 2014 and U.S. Provisional Application 62/022,298, filed Jul. 9, 2014. These applications are hereby incorporated by reference herein.

FIELD OF THE INVENTION

The invention relates to methods and apparatuses for encoding video (sets of still images) in a new color space definition, and decoders and decoding methods using such color space having easier decoding.

BACKGROUND OF THE INVENTION

Ever since the 19$^{th}$ century, additive color reproductions have been represented in an RGB space of driving coordinates for generating red, green and blue primary light outputs. Because giving these different primaries different strengths (luminances) is the way to make all colors within the so-called gamut (the diamond shape obtained by the three vectors defined by the maximum driving possible e.g. Rmax) corresponding to the primaries in some generic color space like XYZ). Or similarly one can define such colors in another linear space derived from the primaries (e.g. XYZ, or UVW). This is done by linear combination of the vectors, i.e. one can calculate the new color coordinates by multiplying the old ones in the other color space definition by multiplying with a conversion matrix.

Now it is very useful, and was historically necessary for black-and-white television, to have an achromatic direction which only encodes the luminances Y, since also the visual system has a separate processing channel for this. This is obtained by putting the gamut on its tip, which is black, represented in FIG. 1a by the black dot. The gamut of a color representation space, when tied to a reference monitor (or any monitor the signal is sent to if the reference is undefined) is gamut 101. In this same philosophy one could also imagine theoretical primaries which can become infinitely bright, leading to a cone shape 102. Several color spaces are defined according to this principle, especially the closed ones, since they are also useful for painting, where one must mix pure colors with whites and blacks, and can go no higher than paper white (e.g. Munsell color tree, NCS and Coloroid are examples of such a (bi)conal color space, and CIELUV and CIELAB are open cones).

In the television world and video encoding thereof, a specific set of color spaces around this philosophy emerged. Because CRTs had a gamma which amounted to the outputted luminance being approximately the square of the input driving voltage (and the same for the separate color channels), it was decided to precompensate for this and send signals to the television receivers which were defined as approximately square roots of the linear camera signals (i.e. e.g. R' being the square root of R, the amount of red in the scene as captured by a camera, and within a range of e.g. [0,0.7 Volt]). Now because one needed to build on top of the existing black and white transmission system (NTSC or PAL), one also made use of this philosophy of using an achromatic ("black-and-white") coordinate, and two color-information carrying signals R–Y, B–Y (from which G–Y could then be derived). Y in a linear system would be calculable as a*R+b*G+c*B, in which a, b and c are constants dependent on the primaries.

However, one did these simple matrixing calculations in the non-linear space of the derived coordinates R', G', B' (i.e. the square rooted signals). Although the diamond shape of the maximum possible gamut doesn't change by such a mathematical operation, the position/definition of all colors within it does. This means inter alia that Y'=a*R'+b*G'+c*B' is no longer a real luminance signal conveying the exact luminance of all colors, which is why it is called a luma (we will in this text use the word luma for all derived/redefined signals along the achromatic axis which are not linear luminance, i.e. irrespective of what mapping function is used, i.e. not necessarily a square root but any function Y-to-Y' one likes; and we will then see Y' as a technical encoding representing a luminance Y of a color). This is the so-called constant luminance problem, since some luminance information is not in the Y' but rather in the chromatic coordinates Cr, Cb. These are defined as Cr=m*(R'–Y') and Cb=n*(B'–Y'), and in this text we will call them chrominances because they grow larger with increasing luminance of a color (the term chroma also being used). So these coordinates do have some chromatic aspect to them, but also this is mixed with a brightness aspect (psychovisually this is not per se bad because colorfulness is also an appearance factor which grows with brightness). The problem would not be so bad if one did exactly the same inverse decoding, but any transformation on the colors encoded in such a system (which also forms the basis of current MPEG standards) creates problems like e.g. luminance and color errors. This occurs e.g. when one subsamples the chrominances to a lower resolution, and one definitely should avoid doing color grading in such spaces as the results can be all over the place (although some image processing software does work in such spaces). So this is not the most convenient color space to represent colors, since it has problems one had to live with. Another problem is that the coordinates can grow quite large requiring many bits for encoding if Rmax etc. is very large (or in other words, chrominance spaces need many bits to be able to still have enough precision for the very small chrominance values), as with HDR signals, although that can be partially mitigated by defining strong non-linear luma curves defining R' from R etc. A recent example of such a coding space presented to SMPTE is YDzDx color space, which may need at least 10 bits or preferably more (12 bits) for good (wide gamut yet precise) color encoding, and such large words are seen less convenient by the hardware manufacturers.

A second type of color space topologies (FIG. 1b) emerged, of which there are less variants though. If we project the linear colors to a unit plane 105, we get perspective transformations of the type x=X/(X+Y+Z) and y=Y/(X+Y+Z) (and the same for e.g. CIELUV). Since then z=1−x−y, we need only two such chromaticity coordinates. The advantage of such a space is that it transforms the cone into a finite-width cylinder. I.e., one can associate a single chromaticity (x,y) or (u,v) with an object of a particular spectral reflection curve illuminated by some light, and this value is then independent of the luminance Y, i.e. it defines the color of an object irrespective of how much light falls on it. Such a color is then commonly described with dominant wavelength and purity, or the more human quantities hue and saturation. The maximum saturation for any possible hue are the monochromatic colors forming the horseshoe boundary 103, and the maximum saturation for each hue of a particular additive display (or color space) is determined by the RGB triangle. In fact, the 3D view is needed, because the gamut 104 of an additive reproduction or color space is tent-shaped, with peak white W being the condition in which all colors channels (i.e. the local pixels in a RGB local display subpixel triplet) are maximally driven.

The chrominance-based color spaces, for television/video being descendants of NTSC, BT.601 and BT. 709, e.g. the Y'CrCb of the various MPEG and other digital compression standards, have been sufficiently good in practice, although there were several known issues, in particular the mixing of the various color channels due to the inappropriate non-linearities (e.g. luminance changes if some operation is done on a color component, or hue changes when one only wanted to change saturation (or better chroma), etc.). The chromaticity-based color spaces, like Yxy or Lu'v', have never been used for image transmission, only for scientific image analysis.

In particular, R. Mantiuk et al: "Lossy compression of high dynamic range images and video" Proc. SPIE-IS&T Electronic imaging Vol. 6057, 16 Jan. 2006, pages 1-10, deals with finding a color space for lossy encoding of a HDR image or video. In particular they designed a scene-referred encoding which can handle all luminances between moonless sky 10 exp(−5) nit and the surface of the sun 10 billion nit. This can clearly not be handled with classical CIE 1976 Luv space, which was designed to handle typical reflective colors of say between 100% reflective white being a couple of hundredths of nits and some 0.5% black, i.e. LDR image content. They define a new log-type luma axis for a color space in which the luma tries to closely follow the particulars of human vision and therefore has a first linear part below a first threshold, then a power low behavior, and above a second threshold a logarithmic behavior. The log L-uv color model based thereupon is an example of a topologically cylindrically-shaped chromaticity representation.

WO 2010/104624 also defines a similar Log-type luma, but now of a pure log character, which can encode pragmatic luminances up to 10000 nit. They make a color space from this by defining uv chromaticities in equations 3A and 3B in par. [0087], i.e. this makes the color space also cylindrical.

Larson G. W: "Log Luv encoding for full-gamut, high-dynamic range images", Journal of graphics tools, association for computing machinery, vol. 3, no. 1, 22 Jan. 1999, pages 15-31, also describes an encoding for HDR still images. It again uses a logarithmic definition of a luma, so that a high dynamic range of luminances can be encoded with 16 bits of a pixel color word, and the color chromaticities (eqs. 3a & 3b) are encoded with 8 bits each. So the shape of this color space is again merely a cylinder, with a logarithmic luma axis. The resulting encoded image is then output in the TIFF format.

Masahiro Okuda and Nicola Adami: "Effective color space representation for wavelet based compression of HDR images", 14TH International conference on image analysis and processing (ICIAP), 13-17 Sep. 2007, again proposes to use this Log Luv encoding of Greg Ward, but now in a wavelet framework used in JPEG2000.

Recently a desire emerged to start encoding high dynamic range (HDR) video material. These are video images encoded to be rendered preferably on displays with a peak white of at least 1000 nit, and typically interesting images are those which also contain objects over a large span of brightnesses. E.g. a scene which contains both indoors and sunny outdoors objects may have an intra-picture luminance contrast ratio of above 1000:1 and up to 10,000, since black may typically reflect 5% and even 0.5% of fully reflecting white, and depending on indoors geometry (e.g. a long corridor largely shielded from the outdoors illumination and hence only indirectly illuminated) indoors illuminance is typically $k*1/100^{th}$ of outdoors illuminance. Also in night scenes, objects illuminated by e.g. 20 lux street lighting may encode as far lower luminances in the camera pixels than e.g. lamps. There is a desire to render such scenes with high quality, so that indeed the outdoors sunny part of the video images seems to show relatively realistically looking sunlight, and the lamps should be glowing on the HDR display, hence there is also a desire to encode all these pixel luminances faithfully (and preferably even more useful metadata about the scene, or the artistic grading of it). For still pictures codecs were developed which encode the linear color coordinates, but where this can be done for a single still, for video the speed and hardware considerations (whether e.g. the cost of a processing IC, or the space on a BD disk) don't allow or at least dissuade from using such encodings, i.e. we need different ones, which are more pragmatic regarding the technical limitations.

Given the more complex constraints we have in HDR encoding, the prior art color spaces are not optimal anymore, in particular behavior for the darker parts of the image (in HDR a popular scene being a dark basement with bright lights, but in any case there will be statistically a larger amount of significant pixels in a lower part of the luminance range than for LDR—classical low dynamic range—images) is not optimal. Also, since for HDR we want to have liberal control over the luma code allocation functions (which define the mapping of captured or graded luminances Y to a code Y' representing them, see e.g. WO2012/147022), the more severely non-linear nature compared to the square root of Y'CrCb would make the erroneous behavior of the in television encoding typically used chrominances spaces like the exemplary one of FIG. 1a behave highly inappropriate. E.g. this would occur when spatially subsampling the color signals from 4:4:4 to 4:2:0, but also for many other reasons which have to do with changing a color coordinate.

Hence an object of the invention's below presented teachings is to provide an improved color encoding space, improved encoder realizations, and improved decoder realizations which handle such problematic aspects and lead to a more suitable video encoding system which is capable of handling HDR content (whereby we do not mean to say those embodiments are not very suitable for encoding LDR content as well).

SUMMARY OF THE INVENTION

Our below described embodiments solve most of the issues of television encoding (or processing) especially for HDR images, in particular by means of a video encoder (300) with an input (308) to obtain a video from a video source (301) wherein pixel colors are encoded in standardized device independent linear color encoding (XYZ), the video encoder comprising an opto-electronic conversion unit (304) arranged to convert the luminances (Y) of the pixel colors into lumas (Y') with a predetermined code allocation function (F), characterized in that the video encoder comprises a chromaticity determination unit (310), which is arranged to encode chromaticities (u",v") of pixel colors with a mathematical chromaticity definition which yields for pixel colors with a particular hue and a luma below the predetermined threshold luma (E') a maximum encodable saturation (S_bL), being the highest possible saturation for any pixel color having such a hue and luma below the predetermined threshold luma as calculated according to a distance of the color in a chromaticity (u",v") plane for the luma from a pre-specified white point (u"$_w$,v"$_w$) calculated with the equation S=sqrt((u"−u"$_w$)$^2$+(v"−v"$_w$)$^2$), which is lower than a maximum encodable saturation (S_bH) for that particular hue for a pixel color luma above the predetermined threshold luma (E'), and which yields for pixel colors with the particular hue and a luma equal to or above the predetermined threshold luma (E') a constant maximum encodable saturation (S_bH).

This way of encoding has many advantages, such as e.g. decoupling of the chromatic and achromatic directions, and not using too high a bit-rate for encoding darker images or darker parts of images, which happen often in HDR, e.g. when one encodes a very dark night scene (note that even if color errors may not be perceived in one rendering because of the darkness of those pixel colors, in some systems those encoded pixel colors may be processed, e.g. by the user activating a brightening function on tv, or using this grading to color transform to another derived grading to be rendered under other rendering parameters such as display peak white and average surround luminance, and for this the colors may need to be encoded with high precision because the color errors may then become more visible).

This just says that the encoder defines the new (u",v") chromaticity plane in such a manner, that for darker colors (luma below E') the saturation of the most saturated possible color for any hue cannot become too high, in fact, it can not even become as high as the value of S(u",v") which can be reached for colors of luma Y'=E' (above which typically the maximum saturation will be constant, leading to cylindrical behavior, of normal color representation). I.e. the encoder implements some chromaticity plane section reduction scheme counter to the normal chromaticity definition, to make the chromaticities of the darkest colors lower, according to such technical behavior which is suitable for encoding. E.g., those chromaticities could be halved. The fact that we scale the possible values of chromaticities, means that we can encode using the same strategy as a normal uv encoding, but by now allocating less bits, e.g. by the fact that if color values come closer to a single value by scaling down then less DCT values are needed to come to the original values, so this will happen in the DCT and run length encoding of video coders typically (and if that chromaticity data is noisy, it doesn't need to be precisely encoded noise). The value E' will of course be chosen to be as useful as possible for any technical system, i.e. although generically there wouldn't be an absolute precise criterion, a typical design goal is to reduce the amount of coding bits needed for encoding the noise typically present in the dark colors, since noise is not interesting to encode well. So the designer of the encoder can e.g. fix in the lab a good value for E', which works for all typical e.g. MPEG-HEVC video, or specific different values for specific sub-categories of video, like e.g. different source content. So the range of what colors can occur, and hence the needed amount of bits to typically encode them, will thereby depend on the luma of the colors, in particular whether they are dark colors as defined by their relative position around the threshold luma E'. The presented encoder and method are especially useful for high dynamic range images, where the blacks may go deep in noise, especially when the camera is not so high dynamic range as the encoder would expect, but in any case because without smart code allocation more information in pictures of higher dynamic range would demand more bits, which may just not be available in all systems needing to handle the images.

As to the inputted colors we assume the are encoded according to the standard viewer CIE 1931 XYZ color space, but of course the skilled person will understand that the way colors are actually input in the encoder is not a limitation, and they could just as well be e.g. Lab, some RGB encoding, etc. As long as the colors are defined in a unique understandable manner, our encoder and method can recalculate them to a representation which has some luma representation (i.e. some function of luminance) on the Z-axis, and some chromaticity representation orthogonal thereto, but the CIE 1976 uv color plane is advantageous because of its relatively good color uniformity and its encompassing of all colors in nature, but of course the same principles could where desired also be applied in an encoder using e.g. an (r,g) chromaticity plane defined according to some RGB primaries, and typically some white point.

A video encoder (300), in which furthermore the maximum codeable saturation (S_bL) for colors with a luma below the threshold luma (E') decreases as a monotonic function of the luma (Y') of the pixel color. In fact, several chromaticity section reduction mechanisms for the darker colors below E' can be envisaged and work nicely (monotonicity is not absolutely required, since there may be other ways to reduce the dark colors, which still lead to relative small section planes there, which we could e.g. define in a LUT which defines any 2D scaling mapping for each luma Y' value below E'), but the one which reduces the maximum possible saturation as a monotonic function which is e.g. linear or quadratic with the luma value starting from the blackest black is a nicely simple one, and typically also simple to implement in hardware or calculation software. This makes sure we need less and less bits for the regions where the colors recorded, especially in chromaticity representations may become more noisy. This would create Crayon-shaped color spaces as e.g. in FIG. 3*a*. The way in which the attenuation function is defined defines also the bluntness of the Crayon tip. This is useful for the video to be coded. On the one hand in some preferred embodiments we would like the colors with the darkest lumas to have the largest attenuation, as then a significant amount of noise cannot create large amounts of bits for encoding this less useful data. A monotonic function is not only easily designed, and e.g. on the fly calculated, but also useful because the functions that generate the noise in the u,v signal to be encoded also boost it in dependence on the lumas via the projective equations yielding u,v. Some further considerations can as we show design the bluntness of the Crayon tip, by taking into account inter alia the characteristics of the digital compression itself, e.g. DCT decoding errors. In general when applying our teachings one should design the Crayon tip (i.e. the attenuation function) such, if one uses it predominantly to minimize wasted coding bit-rate in the dark noisy image regions, so that all noise factors (i.e. where the noise begins to lose any contribution of a visually significant signal) across those low luma region can have minimal impact. This optimizing of the attenuation function can be done either on the fly by analyzing e.g. noise statistics of a set of images, in which case typically the particular attenuation function shape will be communicated from transmitter to receiver e.g. as a LUT, or one can design embodiments which use a fixed strategy averagely good for most content (and then typically encoding a little more noise than necessary, but still far less than without the Crayon tip). In between embodiments can use a number (e.g. 3) of pre-agreed functions, which can be selected at transmitter side, and the transmitter communicating the number of the function chosen, so that the transmitter (either automatically or with a human checking on a display the result of his choice(s)) can send a different function depending on e.g. whether a high end large pixel well camera was used which gives clean signals, or even a computer for creating computer graphics video, or a noisy cheap consumer camera, etc.

A video encoder (300) comprising a spatial subsampling unit (302) arranged to reduce a spatial resolution of the color information, which unit is arranged to perform the sumsampling by a factor (ss) on linear (XYZ) pixel colors, and to output a subsampled image of (XYZ) pixel colors as input for the chromaticity determination unit (310). Yuv video encoding is useful for many types of (HDR or LDR) video, so also non-subsampled images, but as typically video encoders use subsampling (e.g. if we encode the u,v, components in a legacy MPEG encoding technology as if they were CrCb images), it is advantageous to use an optimal subsampling and reconstruction method for such Yuv coding, which inter alia involves subsampling at the encoder in a color representation which is still linear with the pixel luminances (i.e. some color basis transformation of XYZ, or XYZ itself).

It is advantageous to encode color information in a lower resolution. Our new encoding technology has considerable freedom on how and where to do subsampling.

Advantageous is an embodiment of the video encoder (300), in which the lumas are encoded in a word of 8, 10, 12 or 14 bits. Although we don't want to limit ourselves to a particular bit rate for the color components, since in fact our embodiments may in principle work with any bit-rate, especially for HDR video we can get similar quality with lesser bit-rate than classical chrominance-based representation (n.b. where we use the terminology chrominance this may be both a linear luminance-based color coordinate, but typically in video encoding the non-linear ones are used, e.g. after applying a standardized power function (e.g. Rec. 709 etc.) which is approximately a square root). The smarter one chooses the code allocation or opto-electronic conversion function OECF, the less bits are in principle needed to encode all relevant image information. Our embodiments can use both a single standardized function, or one on-the-fly generated and co-encoded as metadata, e.g. per shot of images, or scene.

A video encoder (300) embodiment in which the chromaticities are encoded in a word of 6, 7, 8, 9, 10, 11, or 12 bits for each chromaticity coordinate. Our chromaticity encoding allows to get very good accuracy from high luminances or lumas down to the low ones, with lesser bits than chrominance-based encodings.

A method of video encoding comprising:
receiving an input video from a video source (301) wherein pixel colors are encoded in a standardized device independent linear color encoding (XYZ),
performing an opto-electronic conversion of the luminances (Y) of the pixels by applying a predetermined code allocation function (F) to the luminances (Y) to obtain lumas (Y'),
characterized in that the method further comprises calculating chromaticities (u",v") of pixel colors with lumas (Y') below a predetermined threshold luma (E') with a mathematical chromaticity definition, which yields a maximum encodable saturation (S_bL) for a particular hue for pixel colors with a luma below the predetermined threshold luma (E') which is lower than a maximum encodable saturation (S_bH) for the particular hue for a pixel color with a luma above the predetermined threshold luma (E'), the maximum encodable saturation being the highest possible saturation for any pixel color having such a hue and luma below the predetermined threshold luma as calculated according to a distance of the color in a chromaticity (u",v") plane for the luma from a pre-specified white point $(u''_w, v''_w)$ calculated with the equation $S=\mathrm{sqrt}((u''-u''_w)^2+(v''-v''_w)^2)$, and a constant maximum encodable saturation (S_bH) for pixels with colors of a particular hue and a luma equal to or larger than the predetermined threshold luma (E').

A video encoding signal (S_im), characterized in that for an image of the video the colors of pixels are encoded in a color space defined by an achromatic luma (Y') coordinate, and two chromaticity coordinates (u",v"), the color space being defined as having the property that for a lower luma part (LL) of the color space, defined by all colors in that lower luma part having a luma below a threshold luma (E'), a maximum codeable saturation (S_bL) for a color of a particular hue (h) and a luma below the threshold luma (E') is lower than a maximum codeable saturation (S_bH) for a color with that particular hue and a luma above the threshold luma (E'), the maximum codeable saturation being the highest possible saturation for any pixel color having such a hue and luma below the predetermined threshold luma as calculated according to a distance of the color in a chromaticity (u",v") plane for the luma from a pre-specified white point (u",v") calculated with the equation $S=\mathrm{sqrt}((u''-u''_w)^2+(v''-v''_w)^2)$, and the maximum codeable saturation (S_bH) for a color of a particular hue and any luma above the threshold luma (E') is constant.

A video encoding signal (S_im) in which the maximum codeable saturation (S_bL) for colors with a luma below the threshold luma (E') decreases as a monotonic function of the luma (Y') of the color.

A video decoder (350) arranged to receive, and decode to images defined with pixel colors defined in a linear device independent color encoding (X,Y,Z) or a linear three color primary energy color definition (R,G,B) or a gamma-pre-corrected three color primary energy color definition (R", G",B") device-dependent color encoding, an encoded video signal (S_im) received via an input (358), which encoded video signal (S_im) has for an image the colors of pixels encoded in a color space defined by an achromatic luma (Y') coordinate, and two chromaticity coordinates (u",v"), the color space being defined as having the property that for a lower luma part (LL) of the color space, defined by all colors in that lower luma part having a luma below a threshold luma (E'), a maximum codeable saturation (S_bL) for a color of a particular hue (h) and a luma below the threshold luma (E') is lower than a maximum codeable saturation (S_bH) for a color with that particular hue and a luma above the threshold luma (E'), the maximum codeable saturation being the highest possible saturation for any pixel color having such a hue and luma below the predetermined threshold luma as calculated according to a distance of the color in a chromaticity (u",v") plane for the luma from a pre-specified white point $(u''_w, v''_w)$ calculated with the equation $S=\mathrm{sqrt}((u''-u''_w)^2+(v''-v''_w)^2)$, and the maximum codeable saturation (S_bH) for a color of a particular hue and any luma above the threshold luma (E') is constant.

A video decoder (350) having a color transformation unit (351, 355) which is arranged to apply an inverse correction for the reduced saturation of colors in the lower luma part (LL) of the color space. Therewith the decoder can re-obtain the correct colorfulness of the dark colors, after having followed this color encoding technique.

A video decoder (350) having a scaling unit (356 or 405) arranged for scaling decoded luminance-independent chromatic color components (R-Y/Y,G-Y/Y,B-Y/Y or R"/Y", G"/Y",B"/Y") of the pixels to colors (R-Y,G-Y,B-Y or R",G",B") which have their correct intended luminance, by using for the scaling luminance or luma values (Y, or Y"), the scaling unit being arranged to effectuate the scaling in a linear luminance or a non-linear luma domain. Typically scaling will need to be no more than multiplicative, with the corresponding luma (or luminance) coordinate for the currently processed pixel color. It is very useful to work in luminance-independent color planes or spaces. E.g. chromatic transformations to another color space, of e.g. a connected display can be done in those unity-luma planes. To obtain a real color which has the appropriate correct luminance, and (e.g. XYZ) colors can be converted to R,G,B values for driving a display, we must scale those unity-luminance colors to their correct original colors, or even if one does luminance changing transformations for obtaining luminances more suitable for the connected display than those of the original inputted image, scale with some new advantageous output luma or luminance for the color to be rendered.

A video decoder (350) in which the scaling unit (356 or 405) performs the scaling by multiplying with a maximum of the luminance of the pixel being processed and a threshold luminance (E) respectively a maximum of the luma of the pixel being processed and a threshold luma (E'). This is a computationally simple low cost version to arrive at the desired crayon-shape for the color space.

A method of video decoding comprising:
receiving an input signal (S_im) in which pixel colors are defined in a color space defined by an achromatic luma (Y') coordinate, and two chromaticity coordinates (u", v"), the color space being defined as having the property that for a lower luma part (LL) of the color space, defined by all colors in that lower luma part having a luma below a threshold luma (E'), a maximum codeable saturation (S_bL) for a color of a particular hue (h) and a luma below the threshold luma (E') is lower than a maximum codeable saturation (S_bH) for a color with that particular hue and a luma above the threshold luma (E'), the maximum codeable saturation being the highest possible saturation for any pixel color having such a hue and luma below the predetermined threshold luma as calculated according to a distance of the color in a chromaticity (u",v") plane for the luma from a pre-specified white point ($u"_w, v"_w$) calculated with the equation $S=\sqrt{(u"-u"_w)^2+(v"-v"_w)^2}$, and the maximum codeable saturation (S_bH) for a color of a particular hue and any luma above the threshold luma (E') is constant, and
decoding these pixel color definitions into a linear color encoding or a gamma-precorrected device-dependent color encoding (R",G",B").

Our technologies can be embodied in various forms and ways, such as e.g. a memory product such as a blu-ray disk or a solid state memory card storing the new video encoding signal (S_im), or a method of operating a video communication over a network (320) from a video source (399) to a decoder (350) wherein the method comprises transmitting over the network the new video encoding signal (S_im), or a computer program product comprising code enabling a processor to implement the various encoding or decoding method embodiments according to the principles of our invention.

Further interesting embodiments are i.a. a video decoder (350) having an input (358) for receiving a video signal (S_im) in which pixel colors are encoded with an achromatic luma (Y') coordinate and two chromaticity coordinates (u", v"), the video decoder comprising a scaling unit (356) arranged to transform the chromaticity colors in a luminance-dependent chrominance color representation, by scaling with the achromatic luma. This allows a very nice decoupling of any encoding or processing one wants in an achromatic and chromatic direction. The final scaling to a correctly luminance-scaled color representation (i.e. e.g. a linear representation, which is equivalent to XYZ with color coordinates which grow in size with XYZ or more precisely the Y thereof; but this can also still contain some non-linearity like e.g. a gamma transformed representation, but in any case, the output is again some chrominance color space representation) can then be done at the end, even in the gamma domain of the display, or any succession of achromatic direction mappings can be coagulatedly done at the end, typically with a final luma scaling function.

A video decoder (350) in which a chromaticity basis transformation unit (352) is included, at a position in the color processing pipeline before the scaling unit (356), the basis transformation unit (352) being arranged to do a transformation to a new color representation, in a unitary luminance 2 or 3-dimensional color representation, which new color representation is preferably a unitary (R,G,B) one. The skilled person will realize from our teachings the equivalence of color transformations in a color plane, and 3D transformations in a unitary scaled space (i.e. typically with the luma having a maximum of one, and the luminance-independent 3 color coordinates like e.g. (R-Y)/Y scaled similarly), and in which cases two coordinates are sufficient or advantageous (e.g. for rotating from u",v" to another color space like a,b of CIELab etc.), and in which cases 3 coordinates are advantageous, such as e.g. for doing preparatory calculations for arriving at 3 RGB driving values. So one can do whatever basis transformation one desires in the color plane.

A video decoder (350) comprising an opto-electronic conversion unit (404) arranged to apply a power function to its input color coordinates, which unit is situated at a position in the color processing pipeline before the scaling unit (356). This allows transforming to a display 1/gamma precompensation space already, and doing the luma scaling in this gamma space.

A video decoder (350) comprising a spatial upsampling unit (353), arranged to increase the resolution of an input image of pixels with a color coordinate (u") by applying an interpolation function to obtain pixel values intermediate to those of the input image, the spatial upsampling unit (353) being situated at a position in the color processing pipeline before the scaling unit (356). Another interesting behavior of our color encoding, is that one will preferably do the scaling in the highest resolution (e.g. 4K or 8K) and all other processing in whatever resolution in the luminance-independent representation earlier in the processing chain. Of course when multiplying both the chromatic and achromatic pixel images must be of the same resolution, but one may delay the spatial upscaling until right before the multiplication. E.g., the upscaling may be done on R"/Y" etc. coordinates for display driving, i.e. in the luminance-independent display gamma color representation. This creates the highest sharpness (i.e. one effectively has almost 4:4:4 accuracy when only using a 4:2:0 encoding; note the spatial subsampling at the encoder happening in a linear color space).

A method of video decoding, comprising:
receiving a video signal (S_im) in which pixel colors are encoded with an achromatic luma (Y') coordinate and two chromaticity coordinates (u",v"), and
transforming the chromaticity colors in a luminance-dependent chrominance color representation, by scaling with the achromatic luma.

A method of video decoding, comprising prior to the scaling transforming the input chromaticity coordinates to another luminance-independent color representation, such as ((R−Y)/Y,(G−Y)/Y,(B−Y)/Y).

A method of video decoding comprising prior to the scaling applying a power function to the a luminance-independent representation of additive reproduction color channels (R/Y,G/Y,B/Y).

A method of video decoding comprising doing prior to the scaling a spatial upscaling to the luminance-independent color representation.

A video encoder (300), arranged to encode a video of which the pixel colors are encoded in any input color representation (X,Y,Z) into a video signal (S_im) in which the pixel colors are encoded in a color encoding defined by achromatic luma (Y') coordinate and two luminance independent chromaticity coordinates (u",v").

All these embodiments can again be realized as many other variants, methods, signals, whether transmitted over network connections or stored, computer programs, etc.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concepts, and in which dashes are used to indicate that a component is optional, non-dashed components not necessarily being essential. Dashes can also be used for indicating that elements, which are explained to be essential, are hidden in the interior of an object, or for intangible things such as e.g. selections of objects/regions (and how they may be shown on a display).

In the drawings.

DETAILED DESCRIPTION OF THE DRAWINGS

Figure 2:
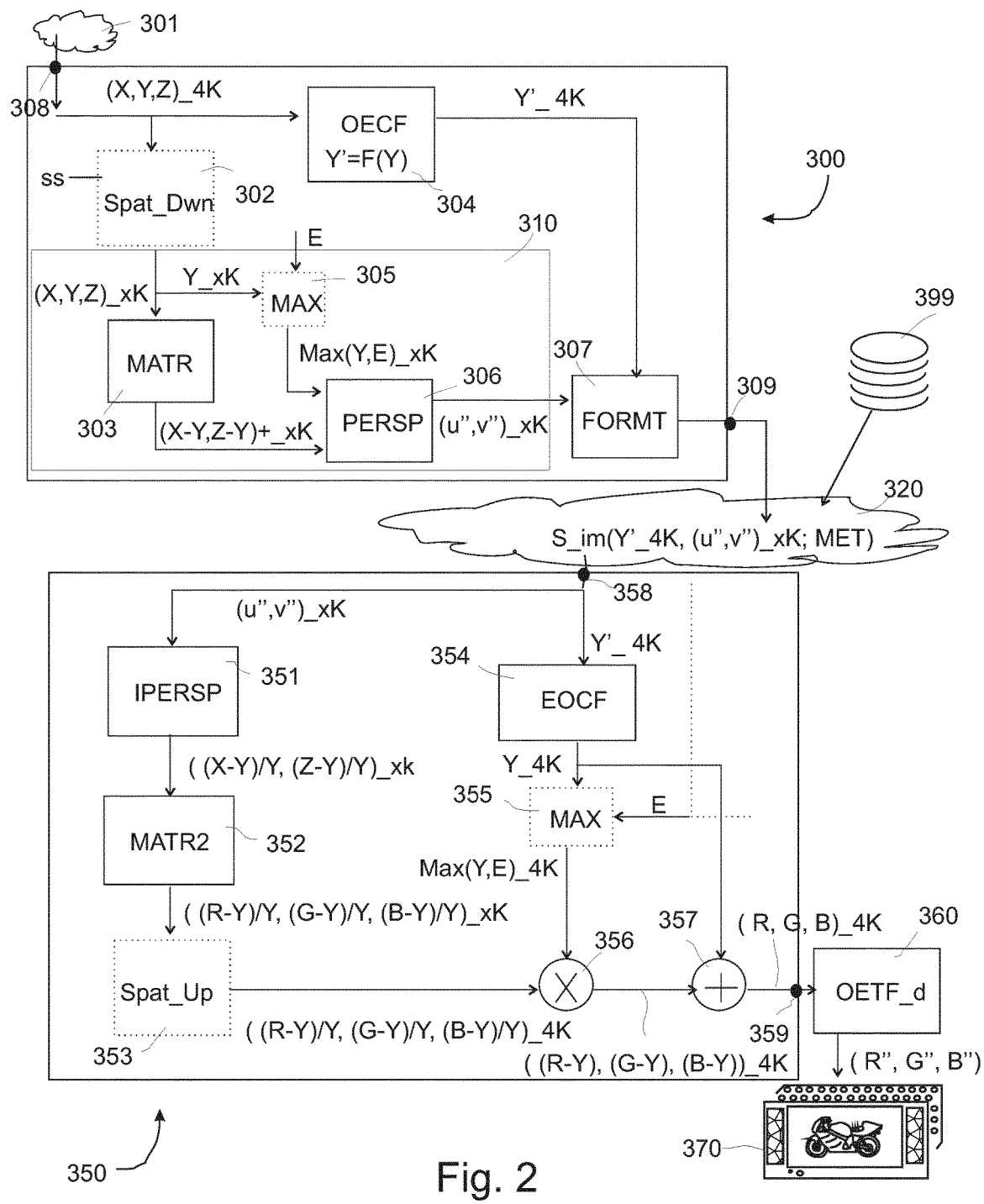
FIG. 2 schematically illustrates an exemplary communication system for video, e.g. over a cable television system, and an embodiment of our encoder, and an embodiment of our decoder.

FIG. 2 shows a first exemplary embodiment of an encoding system according to the newly invented principles and conforming to the new color space definition, with a video encoder 300, and a particular one of possible decoders, namely decoder 305 (there are various ways to build decoders which can handle the Crayon-space defined video images, and can handle e.g. chromaticity u",v" subsampling in a particular manner, do desired color processing, etc., but we teach only one to give the principles). We assume the encoder gets video input via input connection 308 from a video source 301 which already supplies video images in the CIE XYZ format, which is a device independent linear color encoding. Of course the decoder may comprise or be connected to further units which do typical video conversions, like e.g. map from an OpenEXR format, or some RAW camera format etc. When we say video we assume the skilled reader understands there may also be video decoding aspects like e.g. inverse DCT transformation involved, and anything necessary to yield a set of images in which the pixels have colors encoded as (X,Y,Z), which is the part which is needed to explain the details of our invented embodiments. Of course the equations we present below starting from (X,Y,Z) can also be derived for starting from another linear color space like e.g. a (R,G,B) with the RGB primaries standardized, but we will explain our embodiments starting from the universally known CIE XYZ space. As to the artistic part, we will assume the source 301 delivers a master HDR grading, which would be e.g. a movie re-colored by at least one color grader to get the right artistic look (e.g. converting a bland blue sky into a nice purplish one), but the input may of course be any set of temporally consecutively related images, such as e.g. camera RAW output, or a legacy LDR (low dynamic range) movie to be upgraded, etc. We will also assume the input is in a high quality resolution like e.g. 4K, but the skilled reader will understand that other resolutions are possible, and especially that our embodiments are especially well-suited to deal with various resolutions for the different color components.

Typically, though optionally, a spatial subsampling unit 302 will downconvert the signals before the determination of the color information in chromaticities is performed, since the eye is less acute for color information, and therefore one can save on resolution for the chromaticity images, and e.g. interleave the two chromaticity component images in a single to be encoded picture (we have developed our system so that this further encoding can be done with legacy coders, like e.g. MPEG-like coders like an AVC encoder, i.e. by doing DCT-ing etc). E.g., the spatial subsampling unit (302) may use a subsampling factor ss=2 in both directions, to go from 4:4:4 to 4:2:0.

Now this original or reduced resolution (X,Y,Z)_xK signal (where x signifies an arbitrary resolution, e.g. from an 8K original to a 2K input for determining the chromatic information) is input for a chromaticity determination unit 310. In our embodiments we don't use a chrominance-type color space, but a chromaticity-based one, because this has some very advantageous properties. However, the standard chromaticity spaces (i.e. a chromaticity plane+some luminance or luma or lightness axis) cannot be used well, especially for HDR video encoding.

Although in principle other chromaticity plane definitions could be used. We will assume we base our definition on CIE's 1976 Y'u'v' space, or more precisely the chromaticity plane thereof, which we will however reshape by a new definition of the chromaticity coordinates which we therefore will indicate with double primes (u",v"). If one were to use the classical CIELUV 1976 definition (reformulated usefully):

$$u' = \frac{4 * \frac{X-Y}{Y} + 4}{1 * \frac{X-Y}{Y} + 3 * \frac{Z-Y}{Y} + 19} \quad \text{[Eq. 1]}$$

-continued $$v' = \frac{9}{1*\frac{X-Y}{Y} + 3*\frac{Z-Y}{Y} + 19}$$

the resulting color space and the therein encoded colors would have some good properties. Firstly, one very powerful and usable property is that one has decoupled luma (i.e. the coordinate which encodes the luminance, or psychovisually restated brightness), from the pure chromatic properties of the color (i.e. in contrast with chrominances, which also still contain some luminance information). But thinking and experimenting further over the last years, the inventors and their colleagues got deeper insight into that this decoupling has a property which is of major importance for especially HDR video encoding: one can use any code allocation function or opto-electronic conversion function EOCF to encode required luminances (whether those captured by camera or a grading thereof, or the ones to be outputted by a display receiving the video), e.g. very high gamma ones, or even bending ones like S-shapes, or even discontinuous ones (one can imagine the luma to be some "pseudo-luminance" associated with the chrominances). This "don't care property" also means we can decouple some of the desired processing (whether encoding, or e.g. color processing, like re-grading to obtain another look) in the chromatic "unit-luminance" planes only, whatever the bending of the luminances along the luma axis. This also led to an insight that HDR encoding, and even the encoding of other looks (tunability to the required driving grading for e.g. a medium dynamic range display) becomes relatively simple, as one needs one image to encode the spatial object texture structures, which can be done with the (u",v") and some reference shading (Y'), and one can convert to other lighting situations by doing first a dominant redefinition of the Y' and then the further needed processing to achieve the optimal look in the (u",v") direction.

So we will assume that the opto-electronic conversion unit 304 applies any preselected interesting color allocation function. This could be a classical gamma 2.2 function, but for HDR higher gammas are preferable. We could e.g. use Dolby's PQ function. Or we may use:

$$Y' = \left(\frac{e^{m \cdot v} - 1}{m}\right)\gamma \qquad [\text{Eq. 2}]$$

in which m and gamma are constants, and v is defined as (Y−Y_black)/(Y_white−Y_black). Note that the arbitrariness of the achromatic axis means that in principle we could also use linear luminance, and could reformulate e.g. our encoder claim by using a luminance thresholding definition instead of a luma one.

Another advantage of this encoding, is that the chromaticities stay within the same width dimension whatever the luminance. This means that in contrast with chrominance-based color spaces, we can always use the same amount of bits for encoding the chromaticities, and, have a better precision all along the vertical traversing of the color space. In contrast to the Y'DzDx color encoding, which needs more than 10 and preferably 12 bits for the chromatic components, we can get high quality with only 10 bits, and even reasonable quality with 8 bits. We can e.g. allocate the bits evenly over the maximum range of possible chromaticities, u=[0, 0.7], v=[0,0.6], or a little tighter bounding, e.g. [0,0.623], [0.016, 0.587] (we could even clip off some unfrequent very saturated colors, but for wide gamut encoding it may be useful if all possible physical colors are comprised).

Figure 1A:
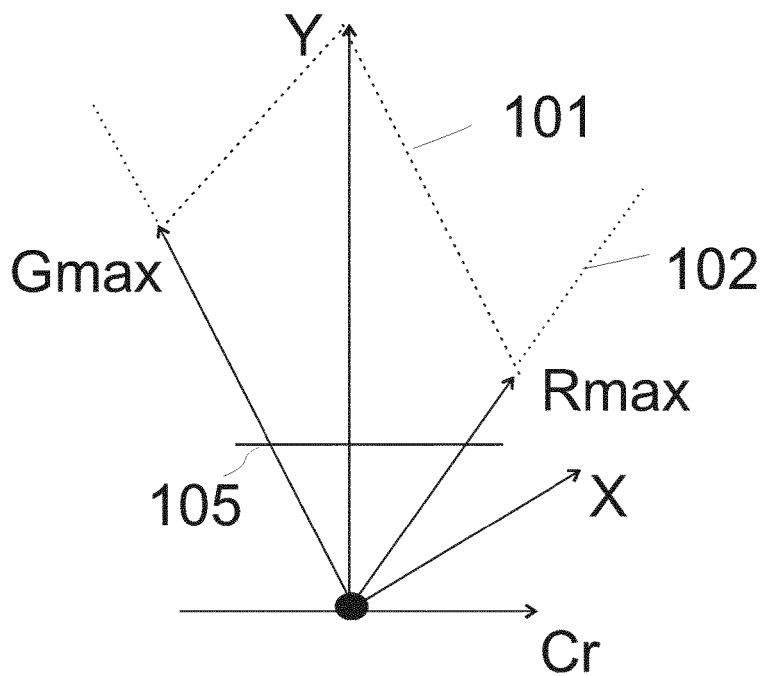
FIG. 1 schematically illustrates the two different topologies for prior art color spaces, cone and cylinder.
Figure 1B:
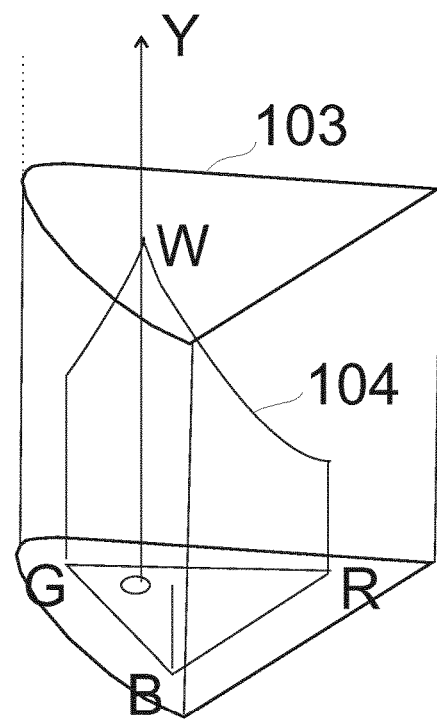

Another advantage of the decoupling is that this elegantly realizes the desire of not only having a HDR (i.e. bright luminances and/or large luminance contrast ratios) encoding, but also a wide gamut color encoding, since (u",v") can encode any chromaticity realizable in nature. Where in our new crayon-shaped color space definition an RGB display would have a tent shape like in FIG. 1b but with its bottom part now fitted (squeezed) in the bottom tip, we could also use our encoded colors to drive a multiprimary display made of e.g. red, yellow, yellowish-green, green, cyan, blue, and violet lasers, which may render very saturated and bright colors.

Another major issue solved, because we really have only the chromatic information in the chromaticities, is that we can avoid large color cross-talk problems which occur at color boundaries, especially in classical chrominance-based television encodings (e.g. a stripe pattern of 1 pixel wide dark red and light grey lines, or complementary colors), e.g. when subsampling is involved. Using Y'DzDx space may introduce major color errors (e.g. a dark red/light grey line interleaving converts to a weird bright orange color). Our implementation of doing first the subsampling in the linear XYZ domain, and then using our (u",v") creates normal colors despite the 4:2:0 encoding of the chromatic information.

A disadvantage of a such a cylindrical Y'u'v' encoding is however that because of the division by Y, the dark colors become very noisy, which increases the bit-rate required by the transform-based encoder. Therefore we have redefined the color space definition, and hence the corresponding perspective transformations defining the mapping from (X,Y,Z) to (u",v"), so that the encoder can elegantly handle this problem with the new video encoding, i.e. without resorting to all kinds of further tricks like e.g. denoising etc.

Figure 3A:
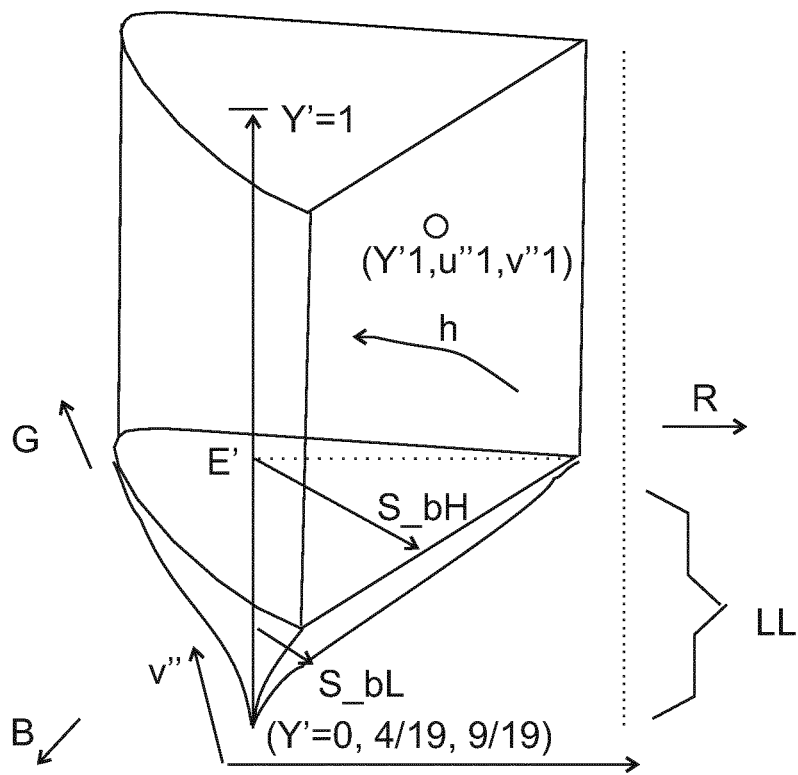
FIG. 3 schematically illustrates a new crayon-shaped color space we introduced, which is useful for encoding colors, in particular when data compression of a kind identical or similar to DCT encoding is involved.

Our new perspective transformations lead to a crayon-shaped color space as shown in FIG. 3a. The bottom part has been shown exaggerated in size to be able to draw it, as the tapering tip will only occur for the darkest encodable colors, falling in the bottom part LL. With this part corresponds a predetermined threshold luma E', and in view of the separation of the luminance direction and its ad libitum choosable OECF, with any choice E' also corresponds a unique value of threshold luminance E, which can be determined by applying the inverse of the OECF function, i.e. the EOCF (electro-optical conversion function) to E'. E or E' may e.g. be fixed in the hardware of encoder and decoder (a universally usable value), or it may be selected per case, and e.g. co-transferred with the signal, e.g. stored on a BD disk storing the video. The value of E may typically be within the range [0.01, 10] or more preferably [0.01, 5] nit, converted to the unitary representation via division by peak white of the color space. So the fact that no color encoding for a particular input color can occur with a chromaticity larger than (u_xx,v_xx), can be more precisely stated by stating that the boundaries of the gamut in the crayon tip shrink towards a fixed value. This can be mathematically defined by using the saturation sqrt(du"^2+dv"^2), where du"=u"−u"_w, dv"=v"−v"_w, and (u"_w,v"_w) is the chromaticity of a reference white. The horseshoe-shaped outer boundary of the gamut determines for each hue (angle) a maximum possible saturation (for a monochromatic color of that dominant wavelength or "hue"). As we see these outer boundaries stay the same for colors with lumas Y' above E', but become smaller for colors with lumas below E'. We have shown how the maximum saturation for a purple color stays the same S_bH above E', and in the exemplary embodiment of this crayon color space decreases with Y', and renamed as S_bL, below E'. This has the advantage that however noisy, this redefined small chromaticity for dark colors cannot consume too many bits. On the other hand, above E' we find the nice properties of chromaticities, i.e. their perfect and nicely uniformly scaled decoupling from the luminance information.

Figure 3B:
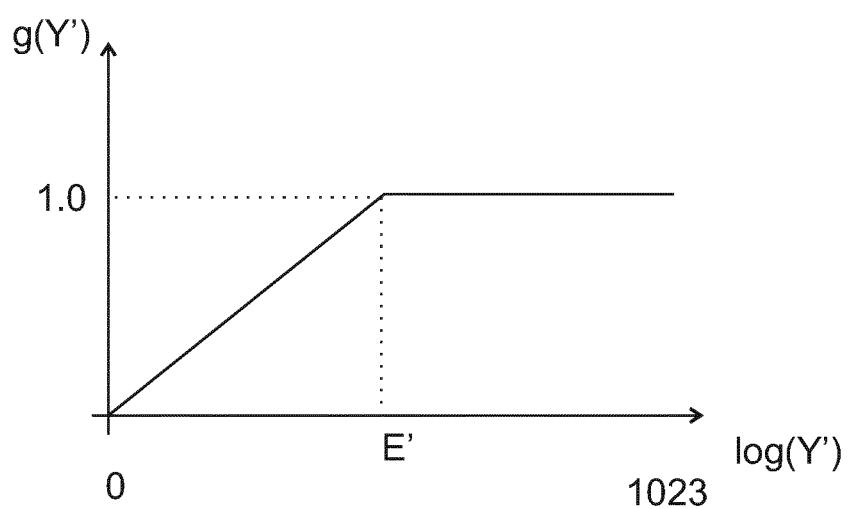
Figure 4:
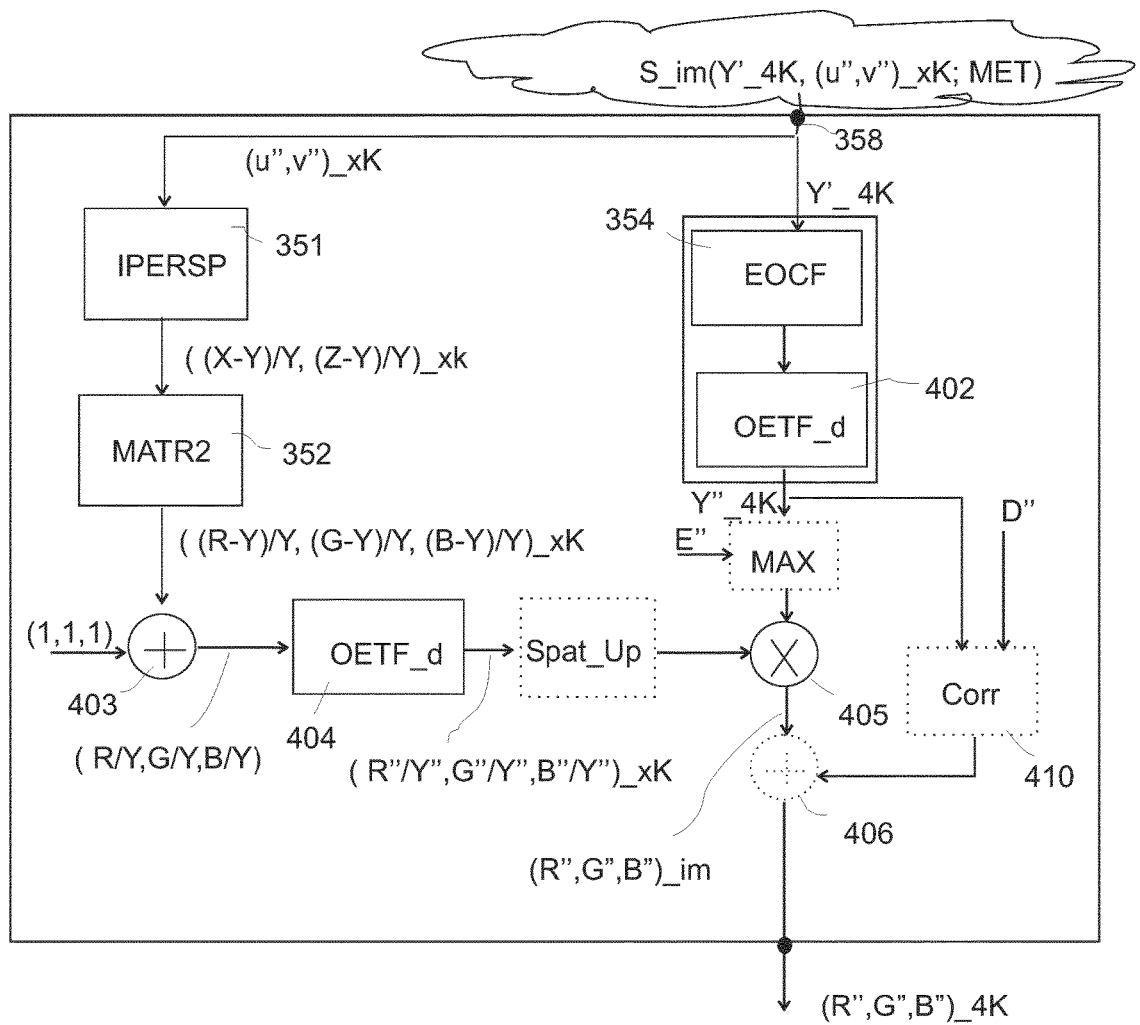
Figure 5:
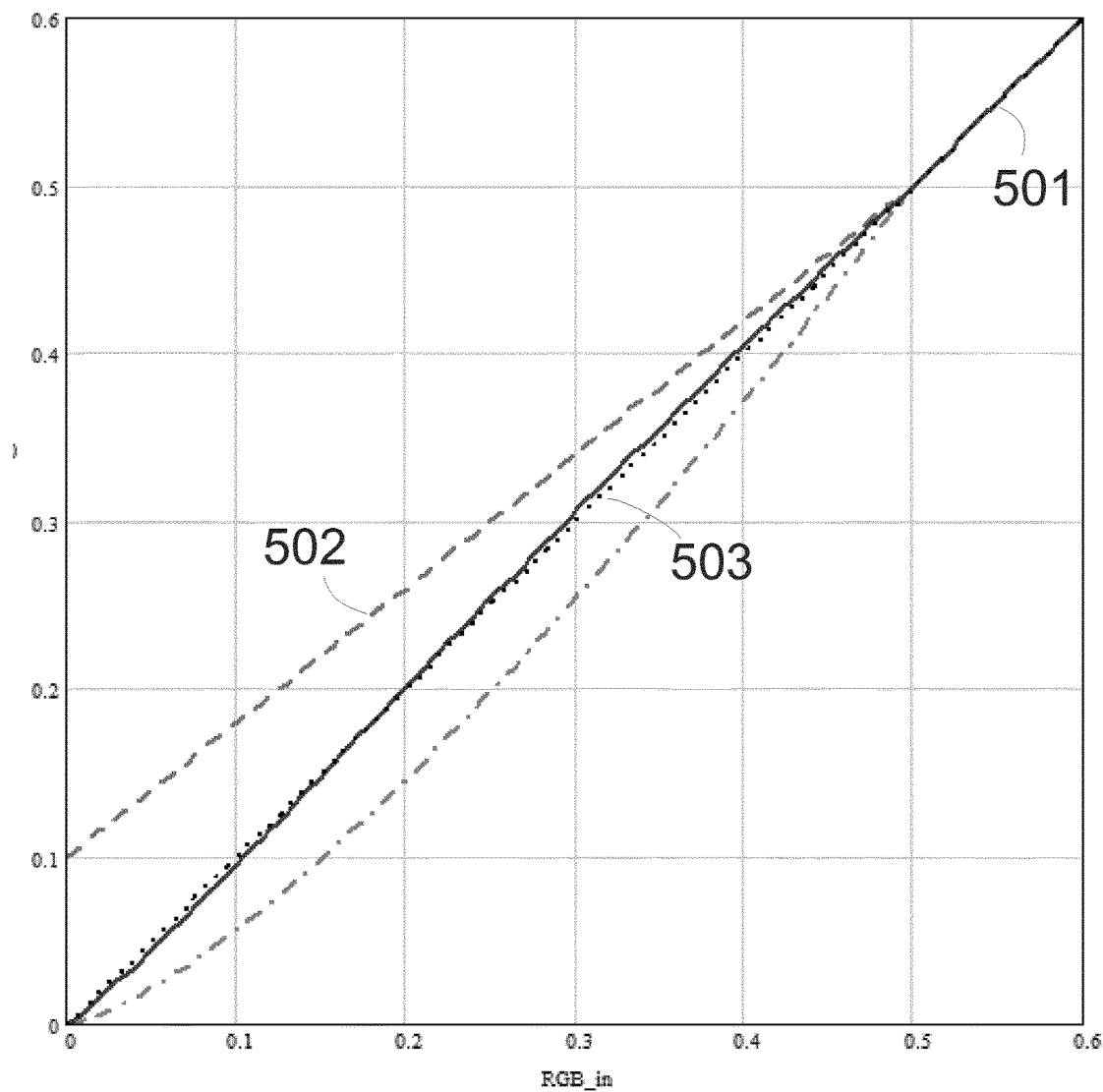

So the encoder has to apply a perspective mapping to obtain u", v" which realizes this behavior (any definition of the equations realizing this will fulfill the desired characteristics of our new encoding technology). One way to realize this is shown in FIG. 3b, and has the encoder apply a non-unity gain g(Y') to the saturations of colors with lumas below E'. Preferably a decoder then applies the inverse gain (i.e. if g_encoder is 0.5 then g_decoder is 2.0) to obtain the same color saturation for the reconstructed colors.

We have shown a linear example, but other functions can be used, such as e.g.: $g(Y')=Y'*((E'+1/E')-Y')$ if $0<=Y'<E'$, $g(Y')=1$ if $Y'>=E'$.

So the chromaticity space formulation can be done as: $(u",v")=(u'\_w,v'\_w)+g(Y')*[(u',v')-(u'\_w, v'\_w)]$, in which $(u'\_w, v'\_w)$ is the chromaticity for some predetermined white point. So applying any non-unity gain smaller than 1 to the chromaticities of the darkest colors, will desaturate them to the chosen white point. If the luma of a particular pixel color to be encoded is above E', then we will apply a gain multiplier of 1, i.e. the output chromaticity $(u",v")$ is equal to the input chromaticity of the original color to be encoded $(u',v')$. This also means that for any hue the maximum possible chromaticity or more precisely the maximum possible saturation (defined as distance from the white point) in the output pixels of a block of high luminances to be DCT encoded will be that value which is defined by the CIE 1976 uv transformation itself. For Y' values below, we are going to scale with a gain which in the above example is itself a suitable function of only the luma Y'. So just to be clear, in the above equation, if e.g. E' was 0.2 then the value of the second term for Y'=0.1 would be 5.1, making the product hence the gain 0.51, i.e. a desaturation to half the saturation of all colors, hence also the maximally saturated ones possible for each hue.

An advantageous embodiment to realize the crayon-shaped color space would recode the definition of the lower luminances in the perspective transform defining the chromaticities.

$$u'' = \frac{4*(X-Y)+4*G(Y)}{1*(X-Y)+3*(Z-Y)+19*G(Y)} \quad [\text{Eq. 3}]$$

$$v'' = \frac{9*G(Y)}{1*(X-Y)+3*(Z-Y)+19*G(Y)}$$

If we define an appropriate G(Y) function, i.e. the appropriate shape in the lower Y regions, we can tune the chromaticity values according to desire, i.e. the width profile of the crayon tip there. So we see the chromaticities are derived from linear color imbalances (X−Y), (Z−Y), and this G-factor which affects the scaling. For neutral colors (X=YZ) the tip will scale down saturation to its lowest white point $(u",v")=(4/19, 9/19)$ for $(X,Y,Z)(0,0,0)$.

The G(Y) realization of the crayon-tip is just one easy way to realize it, as there can be other ways to do this, e.g. by using other correlate functions similar to Y or as long as the geometrical shape behavior of the encoding space gamut is the same.

A very simple possible (optional) embodiment is the one we have shown in FIG. 2, namely using Max(Y,E) as species function for G(Y).

An advantageously simple embodiment of our encoder does first a matrixing by a matrixing unit 303 to determine the X−Y and Z−Y values, e.g. in a 2K resolution image. The perspective transformation applied by perspective transformation unit 306 is then the above transformation, but in the FIG. 2 embodiment we have split the crayon-tapering by the max-function outside and performed by maximum calculation unit 305, from which the result is filled in at the place of the last terms of the perspective equations. Finally the encoder further encodes and formats according to any pre-existing (or future video encoding standard capable of being used for video transmission, e.g. an MPEG-standard) strategy in formatter 307 the images containing data Y' and (u",v"), and encodes this in video signal S_im, possibly together with metadata MET, such as e.g. the peak white of the reference display on or for which the encoded grading was done, and possibly also the chosen value for E or similarly E'.

This video signal S_im can then be sent via output 309 to any receiving apparatus on a video transmission system 320, which non-limitedly may be e.g. a memory product containing the video, like a BD disk or solid state memory card, or any network connection, like e.g. a satellite TV broadcasting connection, or an internet network connection, etc. Instead of going over any network, the video may also have been stored previously on some storage device 399, which may function as video source at any time desired, e.g. for video on demand over the internet.

Receiving this signal, we have shown in FIG. 2 a first possible embodiment of a video decoder 360, which might be incorporated in the same total system e.g. when a grader wants to check what his grading will look like when rendered in a particular rendering situation (e.g. a 5000 nit HDR display under dim surround, or a 1200 nit display under dark surround, etc.), or this receiver may be situated in another location, and owned by another entity or person. Non-limitedly this decoder 360 may form part of e.g. a television or display, settopbox, computer, digital cinema handling unit in a cinema theater, etc.

A decoder will ideally mostly (though not necessarily) exactly invert the processing done at the encoder, to recover the original color, which need not per se be represented in XYZ, but may be directly transformed to some driving color coordinates in some display-dependent color space required by a display 370, typically RGB, but this could also be multiprimary coordinates. So from input 358 a first signal path sends the luma Y' image to an electro-optic conversion unit 354 applying an EOCF being the inverse of the OECF, to recover the original luminances Y for the pixels. Again if we have used the Max(Y,E) definition of the crayon color space, there may optionally be a maximum calculation unit 355 comprised, and otherwise the saturation decreasing is taken care of in the mathematical functions applied by the inverse perspective transformation unit 351. This unit will e.g. calculate the following:

$$\frac{X-Y}{Y} = \frac{9*u''-4*v''}{4*v''}$$

$$\frac{Z-Y}{Y} = \frac{12-3*u''-24*v''}{4*v''}$$

I.e., these are chromatic-only quantities (n.b. one may also see them as X−Y/Max(Y,E), but that doesn't matter as they are achromatic quantities, derivable solely from the (u",v") chromaticities), irrespective of whatever luminance the color of the pixel has. They still need to be multiplied by the right luminance later, to obtain the full color.

The numerator of this is a linear combination of the linear X,Y, and Z coordinates. So we can do matrixing on this, to obtain linear R,G,B coordinates, still referenced by the appropriate luminance as scale factor though. This is achieved by matrixing unit 352, yielding as output (R−Y)/Y, (G−Y)/Y, and (B−Y)/Y. As known to the skilled the coefficients of the mapping matrix depend on the actual primaries used, for the definition of the color space, e.g. EBU primaries (conversion to the actual primaries of the display can be done later by gamut mapping unit 360, which also applies the OETF of the display to precompensate for it in actual driving values (R",G",B") (e.g. this may be a display 370 which expects a Rec. 709 encoding, or it may be a complex driving scheme like e.g. for the SIM2, but that is beyond the teaching of our invention)). We have used the double prime to clearly emphasize that this is not the non-linearity of the code allocation function of the color space, but of the display, and OETF_d is the required non-linear opto-electronic transfer function of the particular connected display. If we did spatial subsampling in the encoder, an upsampling unit 353 will convert the signals to e.g. 4K resolution. Note that this upsampling has been deliberately placed in this position in the processing chain to have better color crosstalk performance. Now the linear difference values (chrominances) R−Y etc. are obtained by multiplying by the appropriate luminances, e.g. Max(Y,E). Finally by adding the linear luminance per pixel to these chrominances, we get the linear (R,G,B) color coordinates, which are outputted on output 359.

A disadvantage of doing the calculations in linear space for HDR video is that 20 (or more) bit words are necessary for being able to represent the million:1 (or 10000:0.01 nit) contrast ratio pixels luminances.

Although the Crayon version as conceptually shown in FIG. 3 works as an embodiment, one can define different and more suitable Y"u"v" Crayon spaces. A problem with attenuating or multiplying by Y/epsilon or Y"/epsilon"—to (near) zero is that one has to amplify with an infinite gain at the receiver. In an ultimately precise system without any errors, that would not be an issue since at the receiver side the original u'v' (as according to CIE 1976) can be re-obtained. However in practice one has to take the typical technical limitations into account. On the one hand there will be errors du and dv on the uv coordinates, which inter alia primarily come from camera noise in the dark regions. But these were whatever they were significantly reduced by attenuation. But there can be further chromaticity errors, due to the encoding technology used. Luckily those will not be that large typically, and not too noticeable because they are just minor discolorations of what are typically already dark colors anyway, so the eye doesn't notice the difference between a somewhat greenish and somewhat bluish black so well. However a more serious concern is that there can be errors on the Y" channel at the receiver as well, and these are more seriously already mathematically, because of them being in the multiplicative scaling. One could have serious saturation errors in the recovered u'v', and even invalid, non-physical values. So we need to account for that using a more blunt crayon tip. A mathematical formula for the attenuation we will use for this is then:

Atten=clip(1, Y"/E", 1/K), in which K may be e.g. 128.

For the Crayon tip region where Y" is below E", multiplication by this division realizes a linear attenuation, which of course becomes 1 where they equal and the vertical cylinder boundaries of the Crayon continue, but we can explicitly bound the attenuation to be minimally no attenuation by multiplying by 1. The more interesting aspect is the limit to 128. Inverting the linear function (701) to obtain the amplification gain to undo the attenuation to re-obtain the correct u',v' values, we obtain for that multiplicative gain of course a hyperbola, which is curve 703, which we now see clipped to a maximum rather than going to infinity. So however we define the attenuation, whether clipped or unclipped, what is really important is clipping the gain of the re-boosting at the receiver (e.g. gain(Y")=CLIP (1, E"/Y", K=128)), Because whatever the u",v" values, whether e.g. (0,0) or confiscated with some small error (i.e. yielding (du,dv) instead of (0,0)), we should never boost that u",v" reconstruction at the receiver too much, in particular if du or dv is large. An even better strategy is then to do a soft-clipping, which one can easily design by making the lowest part of the gain curve follow a linear path, and preferably with a relatively small slope. Not too small because then we don't attenuate the u'v' values sufficiently, and code too much camera noise which either increases our needed encoding bit budget or creates compression artefacts in other parts of the images. But not too large a slope, because then if the receiver makes an error dY" in its Y" value, this can lead to a very different gain boost (g+dg) than the one needed for obtaining the correct u',v' pixel color, i.e. yielding an oversaturated reconstructed color, or because du' needn't equal dv' in general just some large color error. So this sloping part should be balanced either per system, or averagely fine for a number of typical future systems. One can choose various slopes (a 10 bits Y" example with E" about 256). Because this is the very definition of our u'v' colors which are transmitted, the receiver has to know which Crayon tip function was used, i.e. this information has to be transmitted too, and there are various ways to do this. E.g. metadata in S_im may contain a LUT specifying e.g. the particular gain function the receiver has to use (corresponding to the selected attenuation function the content creator used by e.g. watching typical reconstruction quality on one or more displays). Or alternatively a parametric functional description of the function may be sent. E.g. if we know the upper regions of the crayon tip stay linear, we only need to encode the bottom-most part of the tip, and we could e.g. send the point where the soft clipping deviation starts (e.g. P' or P), and a functional description, e.g. a slope of the linear segment, etc. In addition to these simple and advantageous variants, the skilled person should understand there can be various other ways to define the Crayon tip.

How to determine a good exemplary position for E". We assume now that we do the tip definition with Y" being now our HDR-EOTF defined luma, and hence so is E". We assume we have e.g. a HDR encoding for a 5000 nit reference monitor. Assuming typical camera material with the noise around the 10 bit level, that would put it at around 1/1000 of peak white, i.e. we would assume that below 5 nits rendered on a 5000 nit display we would see a lot of noise, which would need attenuation of the u'v' before MPEG DCT coding. We already could calculate that for a e.g. 12 bit luma (maximum code 4096), epsilon E" would be 1024, which would put it at 25% of the code axis. That would seem high, but mind that the EOTF of HDR luma code allocation is highly non-linear, so 25% luma codes are actually pretty dark. About 5 nit, or 0.1% luma actually. The epsilon point E" is where the horizontal line changes into a sloping line, and from the EOTF we can read this falls on about 1000 luma code (or 25%) or 5 nit luminance. Similar strategies can be calculated if one has a much cleaner master signal, e.g. from a better future camera, or a computer graphics generator, and similar crayon tip attenuation strategies can be designed for more severe digital (DCT or other e.g. wavelet) encodings and their envisaged noise, etc.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small circuit part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

The invention claimed is:

1. A video encoder comprising:
an input to obtain a video from a video source, the input configured for receiving a video having pixel colors encoded in a standardized device independent linear color encoding, the video encoder comprising:
an opto-electronic conversion circuit arranged to convert the luminances (Y) of the pixel colors into achromatic lumas (Y'), the conversion using a predetermined code allocation function,
a chromaticity determination circuit, which is arranged to encode chromaticities of pixel colors according to a mathematical chromaticity definition which yields, for pixel colors with a particular hue and a luma, a maximum encodable saturation (S_bL),
wherein a maximum encodable saturation (S_bL) represents the highest possible saturation for any pixel color having a particular hue,
wherein saturation is calculated by the circuit according to a distance of the color in a chromaticity plane for the particular luma from a pre-specified white point according to the equation:

$$S=\mathrm{sqrt}((u''-u''_w)^2+(v''-v''_w)^2),$$

where u" and v" are two chromaticity coordinates that define a chromaticity plane u",v",
where achromatic lumas (Y') and chromaticity plane U",v" define a color space containing the chromaticity plane,
where $u''_w, v''_w$ define a predetermined white spot in the chromaticity plane u",v",
which chromaticity determination circuit using the chromaticity definition yields, for pixel colors with a particular hue and a luma below a predetermined threshold, a maximum encodable saturation which is lower than a maximum encodable saturation (S_bH) for that particular hue, for a pixel having a luma above the predetermined threshold luma, and
which chromaticity determination circuit using the chromaticity definition, yields, for pixel colors with the particular hue and a luma equal to or above the predetermined threshold luma, a constant maximum encodable saturation (S_bH), and
wherein for the maximum codeable saturation (S_bL), for colors with a particular hue and a luma below the threshold luma, chromaticity determination circuit decreases as a monotonic function of the luma of the pixel color.

2. A video encoder as claimed in claim 1, comprising a spatial subsampling circuit arranged to reduce a spatial resolution of the color information, which circuit is arranged to perform the subsampling by a factor (ss) on linear pixel colors, and to output a subsampled image of pixel colors as input for the chromaticity determination circuit.

3. A video encoder as claimed in claim 1, in which the lumas are encoded in a word of 8, 10, 12 or 14 bits.

4. A video encoder as claimed in claim 1, in which the chromaticities are encoded in a word of 6, 7, 8, 9, 10, 11, or 12 bits for each chromaticity coordinate.

5. A method of operating a video encoder comprising:
receiving an input video from a video source into an input of the video encoder, the input arranged to receive pixel colors encoded in a standardized device independent linear color encoding,
performing an opto-electronic conversion of the luminances of the pixels by applying a predetermined code allocation function to the luminances to obtain lumas in an opto-electronic converter of the video encoder,
in a chromaticity determination circuit, encoding chromaticities of pixel colors with a mathematical chromaticity definition which yields, for pixel colors with a particular hue and a luma, a maximum encodable saturation (S_bL),
wherein a maximum encodable saturation (S_bL) represents the highest possible saturation for any pixel color having a particular hue,
wherein saturation is calculated chromaticity determination circuit according to a distance of the color in a chromaticity plane for the particular luma from a pre-specified white point according to the equation:

$$S=\mathrm{sqrt}((u''-u''w)2+(v''-v''w)2),$$

where u" and v" are two chromaticity coordinates that define a chromaticity plane u",v", where achromatic lumas (Y') and chromaticity plane U",v" define a color space containing the chromaticity plane, where u"w,v"w define a predetermined white spot in the chromaticity plane u",v", wherein for the chromaticity definition, the chromaticity determination circuit yields, for pixel colors with a particular hue and a luma below a predetermined threshold, a maximum encodable saturation which is lower than a maximum encodable saturation (S_bH) for that particular hue, for a pixel having a luma above the predetermined threshold luma (E'), and wherein for the chromaticity definition the chromaticity determination circuit yields for pixel colors with the particular hue and a luma equal to or above the predetermined threshold luma, a constant maximum encodable saturation (S_bH), and wherein the maximum codeable saturation (S_bL), for colors with a particular hue and a luma below the threshold luma, decreases as a monotonic function of the luma of the pixel color.

6. A video signal, stored in a medium, that is not a propagating wave, the medium comprising:

in an image of the video, colors of pixels encoded in a color space defined by an achromatic luma coordinate, and two chromaticity coordinates, the color space being defined as having the property that the definition of the chromaticity coordinates yields, for pixel colors with a particular hue and a luma, a maximum encodable saturation (S_bL), wherein a maximum encodable saturation (S_bL) represents the highest possible saturation for any pixel color having a particular hue, wherein saturation is calculated according to a distance of the color in a chromaticity plane for the particular luma from a pre-specified white point according to the equation:

$$S=\mathrm{sqrt}((u''-u''_w)^2+(v''-v''_w)^2),$$

where u" and v" are two chromaticity coordinates that define a chromaticity plane u",v", where achromatic lumas (Y') and chromaticity plane U",v" define a color space containing the chromaticity plane, where u"w,v"w define a predetermined white spot in the chromaticity plane u",v", which definition of the chromaticity coordinates yields, for pixel colors with a particular hue and a luma below a predetermined threshold, in a video encoder circuit, a maximum encodable saturation which is lower than a maximum encodable saturation (S_bH) for that particular hue for a pixel having a luma above the predetermined threshold luma, and which chromaticity coordinates yields, in the video encoder circuit for pixel colors with the particular hue and a luma equal to or above the predetermined threshold luma, a constant maximum encodable saturation (S_bH), and wherein the maximum codeable saturation (S_bL), for colors with a particular hue and a luma below the threshold luma, decreases as a monotonic function of the luma of the pixel color.

7. A video decoder comprising:

an input circuit arranged to receive an encoded image defined with pixel colors defined in a linear device independent color encoding or a linear three color primary energy color definition or a gamma-pre-corrected three color primary energy color definition device-dependent color encoding, in an encoded video signal (S_im), the encoded video signal (S_im) comprising colors of pixels encoded in a color space defined by an achromatic luma (Y') coordinate, and two chromaticity coordinates defined according to a mathematical chromaticity definition which yields, for pixel colors with a particular hue and a luma, a maximum encodable saturation (S_bL), the maximum encodable saturation (S_bL) being the highest possible saturation for any pixel color having a particular hue, the saturation being calculated according to a distance of the color in a chromaticity plane for the particular luma from a pre-specified white point according to the equation:

$$S=\mathrm{sqrt}((u''-u''w)2+(v''-v''w)2),$$

where u" and v" are two chromaticity coordinates that define a chromaticity plane u",v", wherein achromatic lumas (Y') and chromaticity plane U",v" define a color space containing the chromaticity plane, where u"w,v"w define a predetermined white spot in the chromaticity plane u",v", which chromaticity definition yields, for pixel colors with a particular hue and a luma below a predetermined threshold, a maximum encodable saturation which is lower than a maximum encodable saturation (S_bH) for that particular hue, for a pixel having a luma above the predetermined threshold luma, and which chromaticity definition yields, for pixel colors with the particular hue and a luma equal to or above the predetermined threshold luma, a constant maximum encodable saturation (S_bH), and wherein the maximum codeable saturation (S_bL), for colors with a particular hue and a luma below the threshold luma, decreases as a monotonic function of the luma of the pixel color a decoder circuit for decoding the an encoded image of the encoded video signal.

8. A video decoder as claimed in claim 7, having a circuit which is arranged to apply an inverse correction for the reduced saturation of colors in the lower luma part (LL) of the color space.

9. A video decoder as claimed in claim 7, having a scaling circuit arranged for scaling decoded luminance-independent chromatic color components of the pixels to colors which have their correct intended luminance, by using for the scaling luminance or luma values, the scaling circuit being arranged to effectuate the scaling in a linear luminance or a non-linear luma domain.

10. A video decoder as claimed in claim 9, in which the scaling circuit performs the scaling by multiplying with a maximum of the luminance of the pixel being processed and a threshold luminance respectively a maximum of the luma of the pixel being processed and a threshold luma.

11. A method of video decoding comprising:

in an input, receiving an signal (S_im) comprising pixel colors defined in a color space defined by an achromatic luma coordinate, and two chromaticity coordinates defined according to a mathematical chromaticity definition which yields, for pixel colors with a particular hue and a luma, a maximum encodable saturation (S_bL), wherein a maximum encodable saturation (S_bL) represents the highest possible saturation for any pixel color having a particular hue, wherein saturation is calculated according to a distance of the color in a chromaticity plane for the particular luma from a pre-specified white point according to the equation:

$$S=\operatorname{sqrt}((u''-u''w)2+(v''-v''w)2),$$

which chromaticity definition yields, for pixel colors with a particular hue and a luma below a predetermined threshold, a maximum encodable saturation which is lower than a maximum encodable saturation (S_bH) for that particular hue for a pixel having a luma above the predetermined threshold luma, and which chromaticity definition yields, for pixel colors with the particular hue and a luma equal to or above the predetermined threshold luma, a constant maximum encodable saturation (S_bH), and wherein the maximum codeable saturation (S_bL), for colors with a particular hue and a luma below the threshold luma, decreases as a monotonic function of the luma of the pixel color, and decoding these pixel color definitions into a linear color encoding or a gamma-precorrected device-dependent color encoding.

12. A memory product that is not a transitory propagating wave storing a video encoded signal (S_im) comprising:
in an image of the video, the colors of pixels being encoded in a color space defined by an achromatic luma coordinate, and two chromaticity coordinates,
the color space being defined as having the property that the definition of the chromaticity coordinates yields, for pixel colors with a particular hue and a luma, a maximum encodable saturation (S_bL),
wherein a maximum encodable saturation (S_bL) represents the highest possible saturation for any pixel color having a particular hue,
wherein saturation is calculated according to a distance of the color in a chromaticity plane for the particular luma from a pre-specified white point according to the equation:

$$S=\operatorname{sqrt}((u''-u''w)2+(v''-v''w)2),$$

where u'' and v'' are two chromaticity coordinates that define a chromaticity plane u'',v'',
wherein achromatic lumas (Y') and chromaticity plane U'',v'' define a color space containing the chromaticity plane,
where u''w,v''w define a predetermined white spot in the chromaticity plane u'',v'',
which definition of the chromaticity coordinates yields, for pixel colors with a particular hue and a luma below a predetermined threshold, a maximum encodable saturation which is lower than a maximum encodable saturation (S_bH) for that particular hue for a pixel having a luma above the predetermined threshold luma, and
which chromaticity coordinates yields, for pixel colors with the particular hue and a luma equal to or above the predetermined threshold luma, a constant maximum encodable saturation (S_bH), and wherein the maximum codeable saturation (S_bL), for colors with a particular hue and a luma below the threshold luma, decreases as a monotonic function of the luma of the pixel color.

13. A method of operating a video communication over a network from a video source to a decoder wherein the method comprises transmitting over the network a video encoded signal (S_im) comprising:
in an image of the video, the colors of pixels being encoded in a color space defined by an achromatic luma coordinate, and two chromaticity coordinates,
the color space being defined as having the property that the definition of the chromaticity coordinates yields, for pixel colors with a particular hue and a luma, a maximum encodable saturation (S_bL),
wherein a maximum encodable saturation (S_bL) represents the highest possible saturation for any pixel color having a particular hue,
wherein saturation is calculated according to a distance of the color in a chromaticity plane for the particular luma from a pre-specified white point according to the equation:

$$S=\operatorname{sqrt}((u''-u''w)2+(v''-v''w)2),$$

where u'' and v'' are two chromaticity coordinates that define a chromaticity plane u'',v'',
wherein achromatic lumas (Y') and chromaticity plane U'',v'' define a color space containing the chromaticity plane,
where u''w,v''w define a predetermined white spot in the chromaticity plane u'',v'',
which definition of the chromaticity coordinates yields, for pixel colors with a particular hue and a luma below a predetermined threshold, a maximum encodable saturation which is lower than a maximum encodable saturation (S_bH) for that particular hue for a pixel having a luma above the predetermined threshold luma, and
which chromaticity coordinates yields, for pixel colors with the particular hue and a luma equal to or above the predetermined threshold luma, a constant maximum encodable saturation (S_bH), and wherein the maximum codeable saturation (S_bL), for colors with a particular hue and a luma below the threshold luma, decreases as a monotonic function of the luma of the pixel color.

14. A computer program storage medium that is not a transitory propagating wave, comprising code for controlling a video encoder to perform all the steps of the method of claim 5.

* * * * *